April 25, 1961 S. RUHMAN 2,981,847

ELECTRICAL PULSE MANIPULATING APPARATUS

Filed June 24, 1957 2 Sheets-Sheet 1

INVENTOR.
SMIL RUHMAN
BY Henry L. Hanson
ATTORNEY

April 25, 1961 S. RUHMAN 2,981,847

ELECTRICAL PULSE MANIPULATING APPARATUS

Filed June 24, 1957 2 Sheets-Sheet 2

INVENTOR.
SMIL RUHMAN

BY Henry L. Hanson

ATTORNEY

United States Patent Office 2,981,847 Patented Apr. 25, 1961

2,981,847

ELECTRICAL PULSE MANIPULATING APPARATUS

Smil Ruhman, Waltham, Mass., assignor, by mesne assignments, to Minneapolis-Honeywell Regulator Company, a corporation of Delaware Filed June 24, 1957, Ser. No. 667,527

18 Claims. (Cl. 307—88)

A general object of the present invention is to provide a new and improved pulse signal manipulating circuit. More specifically, the present invention is concerned with a new and improved bistable circuit utilizing bistable magnetic cores having rectangular hysteresis characteristics and substantial residual magnetism.

In an article by S. Guterman, et al., entitled "Logical and Control Functions Performed with Magnetic Cores" published in the Proceedings of the I.R.E., volume 43, Number 3, March, 1955, there are described a number of circuit techniques whereby bistable magnetic core devices may be utilized for the manipulating of signals and performing logical functions. As more fully described in said article, the magnetic core devices each comprise one or more magnetic cores which have input windings, output windings and shift windings. The core may be defined as being switched to the "zero" state when the core has been driven into a first saturated region by a pulse applied to the shift winding on the core. The core when switched to the opposite state of saturation may be defined as being in the "one" state. The application of a shift pulse to all of the cores in a circuit will switch the cores to the "zero" state and any core which was in a "one" state will, when switched, generate a signal pulse in the output winding. The output winding signal pulse may be fed to a winding on another core by way of a delay line or be fed back to the core from which it originated to switch the core back to the "one" state. When a core has its output connected back so that the core may be switched back to the "one" state, when a "one" is shifted from the core it is herein defined as functioning as a dynamic storage element. As will be apparent from the description that follows, the core which is the active member of the dynamic storage element need not have a shift pulse applied thereto in order to be considered as being in a particular state. It is not necessary that a "one" be stored in the core so that when a shift signal is applied, the core will be switched and will produce an output signal.

The present invention is directed to an extension of the techniques disclosed in the aforementioned article to a new and improved type of two core storage circuit which may be referred to as a binary flip-flop or binary counter. This binary flip-flop or counter stage is characterized by its having two stable states which may be called a "zero" state and a "one" state. The stable states may be established alternately by the application of successive input pulses of the same type from a single input to the circuit. In the counter stage of the present invention, two cores are utilized to form the counter stage. One of the cores of the circuit is connected so that the output thereof is fed back to the same core. When a "one" is stored in the core and is recirculated when a shift pulse is applied, the circuit is defined as being in one of its two stable states. The other bistable state for the counter stage may be defined as the state in which there is no "one" in the core which forms the dynamic storage element so that this core will not be switched upon the application of a shift pulse.

It is accordingly a more specific object of the present invention to provide a new and improved binary flip-flop or counter stage using magnetic cores.

A still further more specific object of the invention is to provide a bistable binary flip-flop incorporating a core circuit adapted to be dynamically operative to circulate a signal therein when a core in the circuit has been set to a "one" state and shift pulses are applied thereto.

The binary flip-flop or counter stage of the present invention is particularly adapted to be applied as a building block to numerous types of circuits. One such circuit is a binary counter which may be used to provide a binary count of a series of input pulses applied to the circuit. This binary flip-flop or counter stage may also be useful as an element in a frequency divider.

Another more specific object of the invention is therefore to provide a new and improved binary counter circuit utilizing a plurality of counter stages, each comprising a pair of magnetic cores.

A still more specific object is to provide a frequency divider for a series of input signals where the frequency divider comprises a plurality of binary counter stages each of which includes a pair of magnetic cores.

The foregoing objects and features of novelty which characterize the invention as well as other objects of the invention are pointed out with particularity in the claims annexed to and forming a part of the present specification. For a better understanding of the invention, its advantages and specific objects attained with its use, reference should be had to the accompanying drawings and descriptive matter in which there is illustrated and described a preferred embodiment of the invention.

Figure 1:
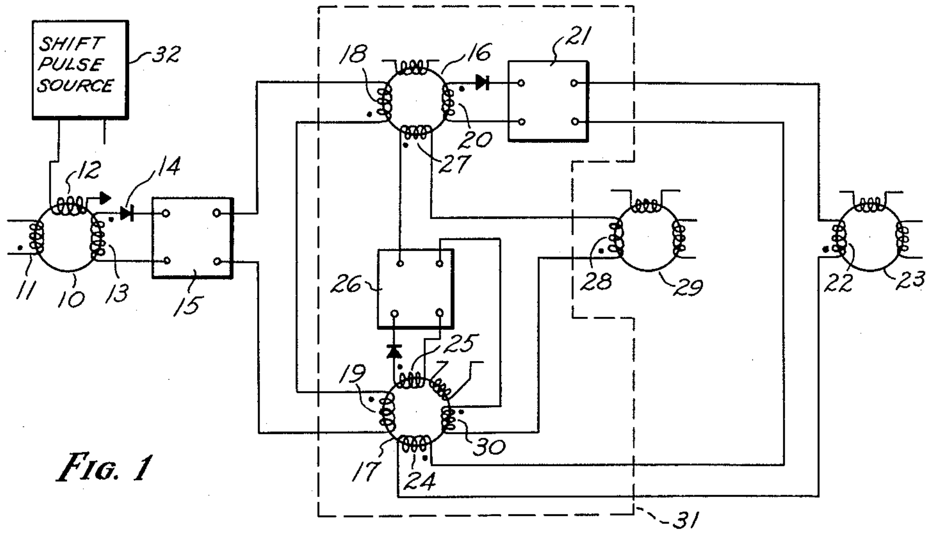
Figure 1 illustrates schematically the binary flip-flop or counter stage of the present invention.

Referring first to Figure 1, the numeral 10 represents a bistable magnetic core having substantial residual flux characteristics of the type which is more fully discussed in the above mentioned article of S. Guterman, et al. This core 10 has an input winding 11 which is adapted, when a signal is applied thereto, to set the core 10 in one of its bistable states. The core 10 is then adapted to be switched back to a reset state, if it has been set by a signal on the winding 11, by an application of a shift pulse thereto to a shift winding, such as the winding 12. The switching of the core 10 back to its reset state will produce a substantial flux change in the core and thereby induce an output signal in an output winding 13. The output signal is connected to pass through a decoupling diode 14 to a time delay circuit 15 and then to input windings on a pair of magnetic core devices 16 and 17.

The magnetic core device 16 has an input winding 18 which will be effective to assert or set the core 16 to a "one" state upon the application of a signal from the core 10 by way of the delay line 15. The core 17 has an input winding 19 which is connected to the delay line 15 and the polarity of this winding on the core 17 is such as to inhibit or prevent the write-in of any signal into the core 17 by way of the other input windings thereon.

Both of the cores 16 and 17 incorporate shift windings which are adapted to switch the cores back to a reset state each time that a shift pulse is applied thereto. It will be apparent that the ampere-turns required for this shifting is a matter of design and dependent upon the type of magnetic core material used in the cores and its dimensions.

The core 16 has an output winding 20 which will have an output signal thereon when the core 16 is switched by a shift signal. This signal on the winding 20 will be passed through a delay network 21. The output of the delay network 21 is coupled to an input winding 22 of an output core 23 and also to a further input winding 24 on the core 17. The presence of a signal on the winding 24 of core 17 will be effective to place the core 17 in a set state. The reading back of a signal into the core 17 by the winding 30 may be inhibited if a signal is concurrently applied to the input winding 19.

When a signal has been written into the core 17 so that the core is in the "one" state, the application of a shift pulse thereto will cause the core to switch back to its reset state and an output signal to be induced into the output winding 25. The signal on the winding 25 will be fed by way of a delay network 26 to an inhibit winding 27 on the core 16 as well as to an assert winding 28 on an output core 29. The signal output from the delay network 26 is also coupled back to an assertive input winding 30 on the core 17. Thus, a signal shifting out of the core 17 through the delay network will inhibit the write-in of a signal into the core 16, will apply an assertive input to the core 29, and will feed back to place the core 17 into a set or "one" state.

Figure 2:
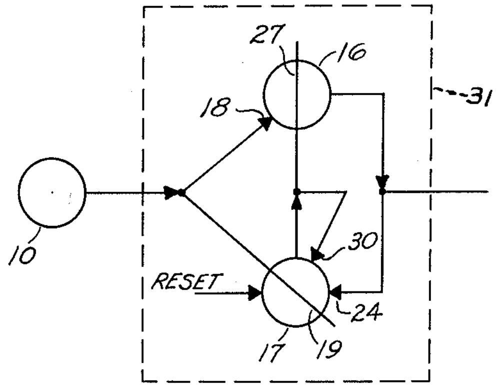
Figure 2 illustrates the logical representation of the circuit of Figure 1.

The logical representation for the binary flip-flop or counter stage of Figure 1 is illustrated in Figure 2 where the core devices 16 and 17 are illustrated within the dotted block 31. The presence of a line crossing the core symbolizes an inhibit line while a signal path entering the edge of the core by means of an arrow symbolizes an assert line for the core for setting the core in a "one" state. Thus the assert winding for the core 16 is denoted at 18 and the inhibit winding for the core 16 is denoted at 27. On the core 17, the inhibit winding is symbolized by the line 19, the assert winding from the core 16 is symbolized by the arrow 24, and the assert winding for the feed back is symbolized by the arrow 30.

In considering the operation of the binary flip-flop of Figures 1 and 2 it is assumed that there are a series of input signals appearing on the input core 10 and that these signals are being shifted into the binary flip-flop by the application of shift pulses to the shift windings on the cores. It is further assumed that the shift windings for all of the cores are being driven by a common synchronized shift pulse source 32 so that the shift pulses are applied to each one of the cores of the circuit at the same time. In the form of the circuit illustrated in Figure 1, two shift pulses are required between the application of each input signal from the core 10.

By definition, the reset state of the binary flip-flop is assumed to be the state in which a signal has been written into the core 17. Thus as shift pulses are applied to the cores 16 and 17, the signal or "one" in the core 17 will be read out of its output winding, passed through its delay line and then read back into the core so that the circuit may be considered to be dynamically circulating a signal upon the application of a shift pulse. The signal out from the core 17 is applied to the inhibit winding of the core 16 so that no information may be written into this core when the core 17 has a "one" shifted therefrom.

When an input "one" signal is received from the core 10, it will be shifted out of the core 10 at the same time that the shift signal will be shifting a "one" signal out of the core 17. The signal from the core 17 will inhibit the write-in of the signal from the core 10 to the core 16 and consequently the core 16 will not be set. Further the signal from the core 10 will be active on the inhibit line 19 of the core 17 to prevent the rewrite-in of the signal shifted from the core 17. Consequently, the core 17 is prevented from being placed in a "one" state where a signal may be read therefrom by the next shift pulse. This means that there will be no signal stored in either of the cores 16 or 17.

Upon the application of the next input signal from the core 10 there will be no signal on the inhibit winding 27 on the core 16 and consequently the assert winding 18 will be capable of placing the core 16 in a "one" state. Upon the application of the next shift pulse, the signal from the core 16 will be read into the core 17 so that the core will again be set to a "one" state. Thus the next shift pulse will be effective to shift the core 17 and the output thereof will read out and then be fed back to place the core 17 in a state where it again may be shifted. This presumes that no further input is received from the core 10. The next input signal from the core 10 will be effective to prevent the circulation of a signal from the core 17 and will place the binary flip-flop or counter stage back in its set state.

It will thus be apparent that the circuitry of Figures 1 and 2 may be defined as a binary flip-flop wherein one or the other of two bistable states may be effected by the application of sequential input signals applied by way of a single input.

The output cores 29 and 23 may be utilized in any desired manner for sensing the state of the binary flip-flop. Thus the reset state of the flip-flop will be indicated by a signal being written into the core 29 by the winding 28 each time that a shift signal is applied to the core 17. The core 23 will have a signal written therein which may be used to designate that a carry should be effected when the circuit is being switched from one bistable state to the other.

It will be apparent that the shift pulses need be applied only during the time that a counting operation is to take place. Thus, a count may be stored indefinitely and then changed by the application of input and shift pulses.

Figure 3:
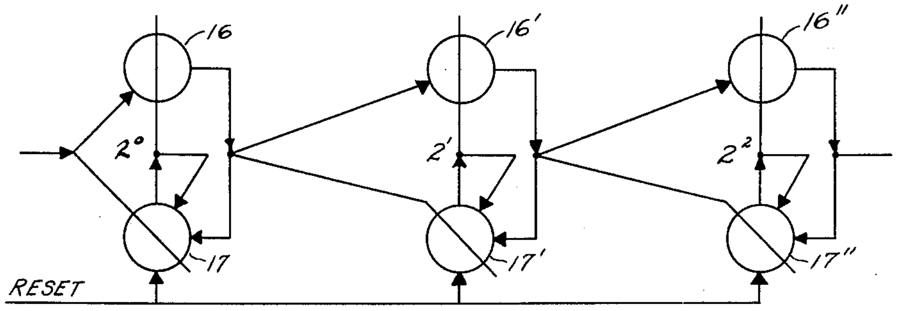
Figure 3 illustrates the manner in which the present invention may be applied to a binary counter.

The application of this binary flip-flop to a counter of the binary type is illustrated in Figure 3. In Figure 3, there are three binary flip-flop stages illustrated with the stages being connected in cascade. The three counter stages may have the designated values of $2^0$, $2^1$ and $2^2$. By definition, the counter stages will all be reset when a signal has been written into the cores which are adapted to be dynamically operative to circulate a signal in the circuit. The cores of this counter stage have been numbered to correspond to the numbering of the cores in Figures 1 and 2. Thus the $2^0$ stage is comprised of the cores 16 and 17, the $2^1$ stage includes the cores 16' and 17', while the $2^2$ stage includes the 16'' and 17''. Thus when the counter circuit has been reset, each of the cores 17, 17' and 17'' will be switched to a "one" state so that when a shift pulse is applied thereto the signal therein will be read out through the output and back into the core again.

The application of the first input signal to the $2^0$ stage will be effective to inhibit the signal recirculation into the core 17 and nothing will be written into the core 16. Thus this stage may now be considered in the set state.

Upon the application of the next input signal, the core 16 will have a signal read into it. Upon the occurrence of the next shift pulse, the core 16 will have a signal read out and this signal will be effective to switch the core 17 and put the core 17 back into a set state so that now this $2^0$ stage will be in a reset state. At the same time, the signal from the core 16 acts as a carry signal which when fed to the $2^1$ stage will inhibit the write-in of any information into the core 17'. Thus, the counter will now be functioning so that the $2^0$ stage is reset, the $2^1$ stage is set and the $2^2$ stage is reset. This indicates by the binary number system that two input pulses have been received. It will be apparent that upon the receipt of the next input pulse on the $2^0$ stage that this stage will again be set. The next input signal following will then be effective to reset the stage $2^0$ and $2^1$ and the stage $2^2$ will be set indicating that a total of four input signals have been applied to the counter.

It will be apparent that the principles of the counter illustrated in Figure 3 may be extended to a large number of counter stages and that these stages will be functioning in the binary form of notation to provide a count of the total number of input pulses applied thereto.

Figure 4:
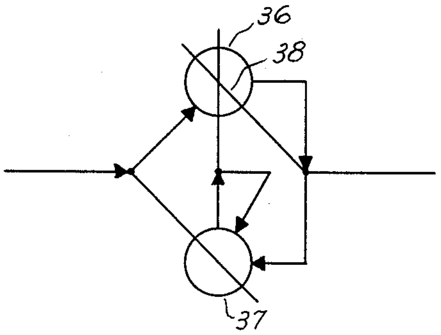
Figure 4 illustrates a modified form of binary flip-flop.

Figure 4 illustrates a modified form of the binary flip-flop in which the apparatus is adapted to operate with the shift pulses and the input signals occurring at the same rate. In this circuit, the cores are designated by the numerals 36 and 37 with the core 36 functioning as the core 16 of Figure 2 and the core 37 functioning as the core 17 of Figure 2. The only modification in the circuit of Figure 4 lies in the incorporation of a secondary inhibit winding 38 on the core 36. This inhibit winding is driven by the output signal shifted from the core 36. This means that there are two inhibit windings on the core 36 instead of the single inhibit windings illustrated in Figure 2. The presence of this inhibit winding 38 is to condition the core 36 so that it may receive an input signal from the input line when the next input signal appears without having to wait for the signal to be shifted from the core 36 to the core 37, and then back to the other inhibit line on core 36, which will require two shift pulses as is the case in the Figure 1 circuit. Thus, the input signals and shift signals may be used on a one-for-one basis in Figure 4.

It will be apparent that the circuit of Figure 4 may be incorporated in a counter circuit in a manner in which the binary circuit of Figure 2 is operative in Figure 3. However, the advantage in the modified circuit will be realized only in the first stage of such a counter for the reason that the signals in subsequent stages will appear only half as often as on the preceding stage.

Figure 5:
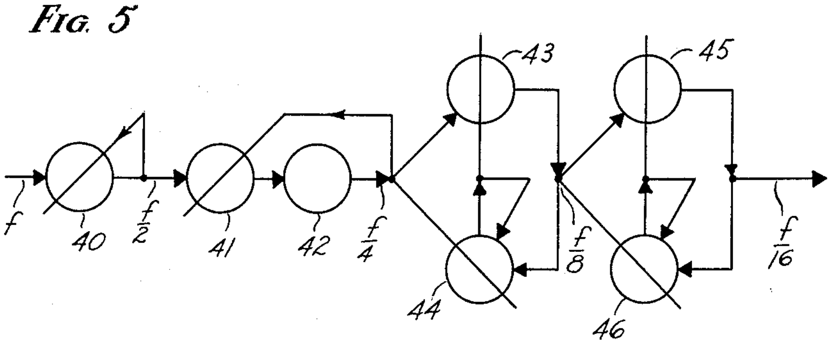
Figure 5 illustrates the manner in which the binary flip-flop of Figure 4 may be applied to a frequency divider.

Figure 5 illustrates the manner in which the binary flip-flop of the present invention may be applied to a frequency divider. In the frequency divider, it is intended that a sequence of input signals be applied to the circuit and that the output from the four stages will be a binary division of input. The division effected in each stage will be by a factor of two. The first stage of division is effected by way of a single core 40 which functions with the output feeding to assert core 41 and also feeding back to an inhibit winding on the same core. Consider first the operation when two successive "ones" are applied to the core 40. The first "one" will be read into the core 40 and upon the application of the next shift pulse the "one" will be read into the core 41. As the signal is read out of the core 40 to the core 41 it is also fed back to inhibit the read-in of the next input signal immediately following. Thus the core 40 functions by itself as a "divide by two" circuit. The core 41 and a further core 42 function as the second "divide by two" divider stage. In this stage, when a signal from the preceding stage is written into the core 41 it will be shifted out by the next shift pulse and read into the core 42. On the next shift pulse, the signal in the core 42 will be shifted out into the next divider stage formed by the cores 43 and 44. In addition, the output of the core 42 is fed back to an inhibit winding on the core 41 so that the next succeeding signal on the output of the core 40 can not be read into the core 41. Thus the output of the core 42 will be $f/4$.

The cores 43 and 44 function in the manner of the cores 6 and 7 of Figure 2. Since the cores 43 and 44 form a binary flip-flop, only every other input signal will be effective to produce an output signal on the output line feeding the next stage. Consequently, this two core circuit functions as a "divide by two" circuit so that the resultant output from the stage will be $f/8$. The final stage illustrated is again formed by a binary flip-flop incorporating two magnetic cores 45 and 46 and their associated circuitry. This latter stage is also the same as that illustrated in Figure 2. Since this stage is also a binary flip-flop, it functions as a "divide by two" circuit so that the output from the stage will again be half that of the input. The output here then will be $f/16$. It will be readily apparent that the techniques employed here may be extended to additional stages of division by incorporating similar binary flip-flop stages.

While, in accordance with the provisions of the statutes, there has been illustrated and described the best forms of the invention known, it will be apparent to those skilled in the art that changes may be made in the apparatus described without departing from the spirit of the invention as set forth in the appended claims and that in some cases, certain features of the invention may be used to advantage without a corresponding use of other features.

Having now described the invention, what is claimed as new and novel and for which it is desired to secure by Letters Patent is:

1. A binary flip-flop comprising a pair of bistable magnetic core elements, each including a shift winding and a plurality of control windings, means connecting the output of one of said elements to an input on the same element to form a closed loop circuit, means connecting an output of the other element to an input of said one element, an input circuit adapted to supply signals to said flip-flop, means connecting said input circuit to said one element to inhibit the write in of a signal in said one element, means connecting said input circuit to said other element to write a signal into said other element when a signal is on said input circuit, and means connecting said one element to inhibit said other element when said one element has a signal written therein.

2. A binary flip-flop comprising a pair of bistable magnetic cores, each including a shift winding and a plurality of control windings, means connecting the output winding of one of said cores to an input winding on the same core to form with said one core a closed signal storage loop, means connecting an output winding of the other core to a further input winding on said one core, an input circuit adapted to supply signals to said flip-flop, means connecting said input circuit to said one core to inhibit the assertion of said one core, means connecting said input circuit to said other core to assert said other core, and means connecting said one core to inhibit said other core when said one core has been set to function with a signal stored in said storage loop.

3. A binary flip-flop comprising a pair of bistable magnetic core elements, each including a shift winding and a plurality of control windings, means including a first signal delay circuit connecting the output of one of said elements to an input on the same element to form with said one element a closed loop storage circuit, means including a second signal delay circuit connecting an output of the other element to an input of said one element, an input circuit adapted to supply signals to said flip-flop, means connecting said input circuit to said one element to inhibit the assertion of said one element, means connecting said input circuit to said other element to assert said other element, and means including said first signal delay circuit connecting said one element to inhibit said other element when said one element has been set to function with a signal circulating in said storage circuit.

4. A flip-flop having two stable states adapted to be switched from one stable state to the other and back by the application of successive input pulses comprising a single signal source, a first bistable magnetic core circuit having control winding terminals and shift winding terminals, means connecting said control winding terminals so that upon the application of a shift pulse to said shift winding terminals a signal may be shifted from said core circuit and read back into said core circuit, a second bistable magnetic core circuit having control winding terminals and shift winding terminals, means connecting said first core circuit to selected control winding terminals of said second core circuit to inhibit the reading of any signal into said second core circuit, means connecting further selected winding terminals of said second core circuit to read into said first core circuit, means connecting said signal source to read a signal into said second core circuit in the absence of an inhibit signal from said first core circuit, and means connecting said signal source to said first core circuit to inhibit the reading of any signal into said first core circuit when there is an input signal.

5. A flip-flop having two stable states adapted to be switched from one stable state to the other and back by the application of successive input pulses comprising a signal source, a first bistable magnetic core circuit having winding terminals and a shift circuit, signal delay circuit means connecting said winding terminals so that a signal shifted from said core circuit may be read back into siad core circuit, a second bistable magnetic core circuit having winding terminals and a shifting circuit, means connecting said first core circuit to selected winding terminals of said second core circuit to inhibit the reading of any signal into said second core circuit, means including a second signal delay circuit connecting said second core circuit to said first core circuit, means connecting said signal source to read a signal into said second core circuit in the absence of an inhibit signal from said first core circuit, and means connecting said signal source to said first core circuit to inhibit the reading of any signal into said first core circuit when there is an input signal.

6. A flip-flop having two stable states adapted to be switched from one stable state to the other and back by the application of successive input pulses comprising a single signal source, a first bistable magnetic core circuit having winding terminals and a shift circuit, means connecting said winding terminals so that a signal shifted from said core circuit may be read back into a first input on said core circuit, a second bistable magnetic core circuit having winding terminals and a shifting circuit, means connecting said second core circuit to said first core circuit to read a signal into a second input on said first core circuit when a signal is shifted from said second core circuit, means connecting said first core circuit to selected winding terminals of said second core circuit to inhibit the reading of any signal into said second core circuit, means connecting said signal source to read a signal into said second core circuit in the absence of an inhibit signal from said first core circuit, and means connecting said signal source to said first core circuit to inhibit the reading of any signal into said first core circuit when there is an input signal.

7. In combination, a pair of bistable circuit elements adapted to be set and shifted between two bistable states, means connecting one of said bistable circuit elements so that when set and shifted, the element output feeds back and sets the circuit element, means connecting the other of said circuit elements so that when set and shifted, a set signal will be applied to said one circuit element, a single input circuit, said input circuit being connected to apply a set signal to said other bistable circuit element and an inhibit signal to said one bistable circuit element, and circuit means connecting said one circuit element to inhibit the setting of said other circuit element when a signal is shifted from said one circuit element.

8. In combination, a pair of bistable circuit elements adapted to be set and shifted between two bistable states, a first signal delay means connecting one of said bistable circuit elements so that when set and shifted, the element output signal feeds back and sets the circuit element, a second signal delay means connecting the other of said circuit elements so that when set and shifted, a set signal will be applied to said one circuit element, a single input circuit, said input circuit being connected to apply a set signal to said other bistable circuit element and an inhibit signal to said one bistable circuit element, and circuit means connecting said one circuit element to inhibit the setting of said other circuit element when a signal is shifted from said one circuit element.

9. In combination, a pair of bistable circuit elements adapted to be set and shifted between two bistable states, means connecting one of said bistable circuit elements so that when set and shifted, the element output signal feeds back to a first input and sets the one circuit element, means connecting the other of said circuit elements so that when set and shifted, a set signal will be applied to a second input on said one circuit element, a single input circuit, said input circuit being connected to apply a set signal to said other bistable circuit element and an inhibit signal to said one bistable circuit element, and circuit means connecting said one circuit element to inhibit the setting of said other circuit element when a signal is shifted from said one circuit element.

10. A data manipulating circuit comprising a pair of bistable storage elements, each having an assertive input winding, an inhibit winding, and an output winding, means connecting an output winding of one of said elements to an assertive winding of the other of said elements, means connecting the output of said other of said elements to an inhibit winding on said one of said storage elements and an assertive input winding on the other of said storage elements, a signal input circuit, and means connecting said input circuit to the inhibit input winding of the other of said storage elements and to the assertive input wnding of said one storage element.

11. A binary counter comprising a plurality of serially connected counter stages, each counter stage comprising a pair of bistable elements, each of said elements having input and output windings and one of which is adapted to have the output winding thereof coupled to an input winding thereof to dynamically store a signal therein, an input circuit connected to input windings of said pair of elements to assert one of said elements and inhibit the other of said elements, a connection from the output winding of one of said elements to an input winding of the other of said elements, and a carry circuit connected to said last named connection, and means connecting the carry connection of each counter stage to the input of the next succeeding stage.

12. In combination, a pair of bistable circuit elements, each of said elements having input and output windings and one of which is adapted to have the output winding thereof coupled to an input winding thereof to dynamically store a signal therein, an input circuit connected to input windings of said pair of elements to assert one of said elements and inhibit the other of said elements, a connection from the output winding of one of said elements to an input winding of the other of said elements, and an output circuit connected to said last named connection.

13. A frequency divider comprising a plurality of serially connected divider stages, each divider stage comprising a pair of bistable elements, each of said elements having input and output windings and one of which is adapted to have the output winding thereof connected to the input winding thereof to dynamically store a signal therein, an input circuit connected to input windings on said pair of elements to assert one of said elements and inhibit the other of said elements, a connection from the output winding of one of said elements to an input winding of the other of said elements, an output circuit connected to said last named connection, and means connecting the output connection of each divider stage to the input of the next succeeding divider stage.

14. A binary counter comprising a plurality of serially connected counter stages, each counter stage comprising a pair of bistable elements, each of which has input and output windings and one of which is adapted to be set to dynamically store a signal therein, an input circuit connected to input windings of said pair of elements to assert one of said elements and inhibit the other of said elements, a connection from the output winding of one of said elements to an input winding of the other of said elements, and a carry circuit connected to said last named connection, means connecting the carry connection of each counter stage to the input of the next succeeding stage, and counter reset means connected to each of said stages to insert a signal in that stage adapted to dynamically store a signal therein.

15. A pulse signal manipulating circuit comprising a pair of bistable storage elements each having a plurality of windings associated therewith, an input circuit having an assertive connection to an input winding of one of said pair of elements and an inhibit connection to a winding on the other of said elements, an output connection from said one element connected to a winding of the other of said elements to assert said other element, said last named connection including a connection to a winding to inhibit a signal applied to said one element, and an output connection on the other of said elements connected to an inhibit winding of said one element and to an assertive input of said other element.

16. A pulse signal manipulating circuit comprising a pair of bistable storage elements each having a plurality of windings associated therewith, an input circuit having an assertive connection to an input winding of one of said pair of elements and an inhibit connection to a winding on the other of said elements, an output connection from said one element connected to a winding of the other of said elements to assert said other element, said last named connection including a connection to a winding of said one element, and an output connection on the other of said elements connected to an inhibit winding of said one element and to a further assertive input of said other element.

17. A magnetic flip-flop characterized by two stable states comprising at least two magnetic cores each having two directions of magnetization, input windings respectively linking said cores in one sense, inhibit windings respectively linking said cores in the sense opposite the one sense, output windings respectively linking said cores, delay storage means connecting the output winding of a first one of said cores to the input winding of a second one of said cores and the output winding of said second core to the inhibit winding of said first core, and means for applying input pulses to said input winding of said first core.

18. A magnetic flip-flop characterized by two stable states comprising first and second magnetic cores, an input winding, an output winding and an inhibit winding linking said first core, an input, an output and an inhibit winding linking said second core, first delay storage means connecting the output winding of said first core to the input winding of said second core and to the inhibit winding of said first core, and means connecting the input winding of said first core in series relationship with the inhibit winding of said second core.

References Cited in the file of this patent

UNITED STATES PATENTS

| | | |
|---|---|---|
| 2,708,722 | An Wang | May 17, 1955 |
| 2,852,699 | Ruhman | Sept. 16, 1958 |
| 2,860,832 | Burns | Nov. 18, 1958 |
| 2,902,216 | Pouzet | Sept. 1, 1959 |
| 2,910,674 | Wittenberg | Oct. 27, 1959 |
| 2,919,855 | Trimble | Jan. 5, 1960 |